Oct. 27, 1936.   H. E. IVES ET AL   2,058,883
ELECTROOPTICAL TRANSMISSION
Filed April 8, 1930   3 Sheets-Sheet 1

INVENTORS: H. E. IVES
V. SUBRIZI
BY *Chas Sprague*
ATTORNEY

INVENTORS: H. E. IVES
V. SUBRIZI

BY
ATTORNEY

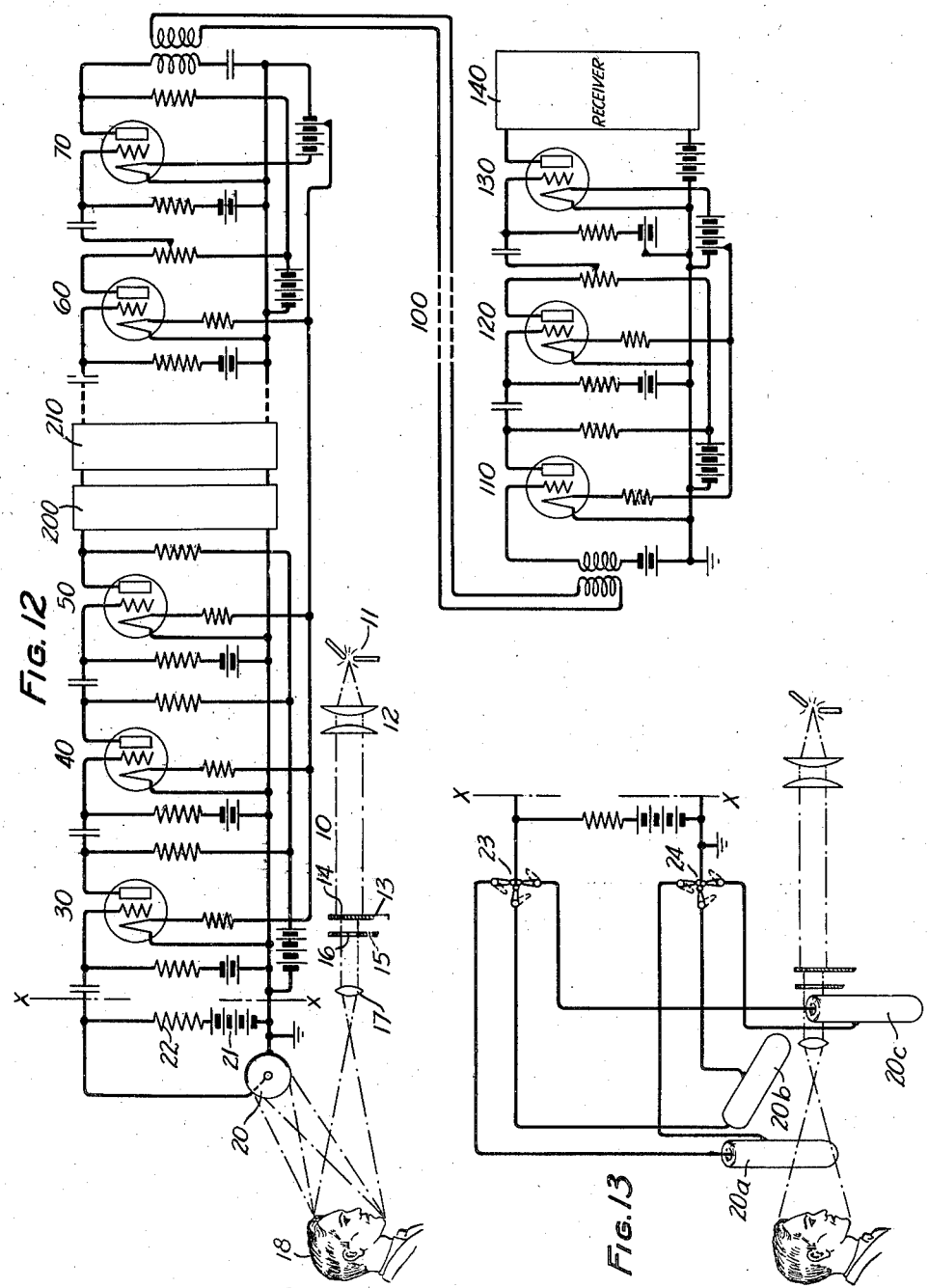

Patented Oct. 27, 1936

2,058,883

UNITED STATES PATENT OFFICE 2,058,883

ELECTROOPTICAL TRANSMISSION

Herbert E. Ives, Montclair, N. J., and Victor Subrizi, New York, N. Y., assignors to Bell Telephone Laboratories, Incorporated, New York, N. Y., a corporation of New York Application April 8, 1930, Serial No. 442,504

1 Claim. (Cl. 178—6)

This invention relates to electro-optical transmission and more particularly to compensation of the varying response in photoelectric translating devices which with a given light excitation respond differently at different frequencies of excitation.

An object of the invention is to effect an improvement in electro-optical image systems of the kind employed in television making use of gas-filled photo-electric cells.

Two types of light sensitive cells have been employed in electro-optical systems, namely, the resistance type such as the well known selenium cell which changes its electrical resistance when exposed to varying light excitation and the electron emission type such as the photoelectric cell which changes its electron emission when exposed to varying excitation. It has long been known that the resistance type cell did not transmit electrical currents in direct proportion to light excitation of different durations or frequencies. The photoelectric cell has generally been considered as responding in direct proportion to its light excitation irrespective of its duration or frequency, that is, as possessing no time lag or sluggishness. This assumption is not in accordance with the facts.

This invention is based on the discovery that photoelectric cells have a varying response with a given light excitation which varies with different durations or frequencies of such excitation. The varying response manifests itself in two forms; first, in a non-uniform amplitude response of the cells to constant light excitations of different durations or frequencies; and, second, in a phase displacement between light excitation and resultant photoelectric current which also varies with and is not proportional to frequency.

The erroneous assumption that photoelectric cells follow a constant amplitude response characteristic may be accounted for in part by the fact that the deviation is small for the lower frequencies up to several thousand cycles per second. The inventors discovered in testing various photoelectric cells that in gas filled cells the comparatively insignificant distortion at 1,000 to 2,000 cycles per second was three or four times greater at 5,000 to 6,000 cycles per second and the distortion was doubled at about 10,000 cycles per second and again doubled at about 20,000 cycles per second and continued to increase as the frequency increased. In the operation of television systems comparatively high frequencies are required for obtaining good resolution in the produced image and the width of the frequency band increases with the size of the image and the degree of resolution. It is therefore obvious that distortion varying with frequency becomes a more and more important factor in the development of television systems.

This invention provides for correcting for this distortion and makes possible the faithful production of images even where very wide frequency bands are required. Applicants discovered that the variation of the photoelectric cell amplitude response was chiefly effected by inter-electrode capacity of the cells and the character and amount of gas in the cells. Measurements of the inter-electrode capacity effect, the gas effect and the effect of the circuit to which the cells were coupled were carefully made to determine the magnitude of the various effects at various frequencies of operation. The results of these tests are shown in a number of curves in the drawings, and also several different means for compensating for the distortion so as to produce a resulting signal current varying substantially with the light intensity irrespective of frequencies. The curves here shown are confined to photoelectric cells containing small amounts of argon and neon. The cells differed among themselves in the overall diameter of the anode, in the treatment of the photosensitive surface, and in other respects incidental to the manufacture of the cells. In general it was found that the different cells followed the same general variation with frequency but to different degrees and at different rates of change, as evidenced by the curves shown herein. In making the tests the cells were excited by light waves whose intensity with time varied substantially sinusoidally and covered a frequency range of from about 1,000 to 35,000 cycles per second. The decrease in relative response up to 1,000 cycles per second was in most cases comparatively negligible.

In a particular arrangement which embodies and is illustrative of this invention a photoelectric cell is employed at the transmitting station of a television system to translate the light effects produced, as the result of scanning a field of view, into an electrical current of varying amplitude. This current is amplified by vacuum tube amplifiers. The circuits employed for coupling the photoelectric cell to the amplifier circuit and for coupling successive stages of the amplefier comprise impedance elements which suppress the direct and the very low frequency current components and compensating networks arranged to substantially compensate for the varying response of the photoelectric cell at different frequencies. The compensating networks while here shown located at the transmitting station may be located at either the transmitting or the receiving station or in part at both stations. While not a part of this invention, there is introduced into the received image current components of direct and very low frequency to compensate for those suppressed by the transmission circuits. Oscillations at troublesome frequencies which cause spots and streaks in the produced picture are prevented by avoiding circuits which include inductances and capacitances in such proportions as to cause such oscillations. Inductances, when used, are so designed as to avoid parasitic currents which would produce distortion of the image due to oscillations between the inductance and distributed capacity or capacity between the coils and ground.

A more detailed description of the embodiment of the invention chosen for illustration follows, and is illustrated in the accompanying drawings.

Fig. 12 is a diagrammatic circuit of a television system including equalizing networks arranged to substantially compensate for the distortion of the photoelectric cell and its associated circuit.

Fig. 13 is a diagrammatic arrangement of a part of the transmitting apparatus showing a plurality of photoelectric cells connected in parallel.

Figure 1:
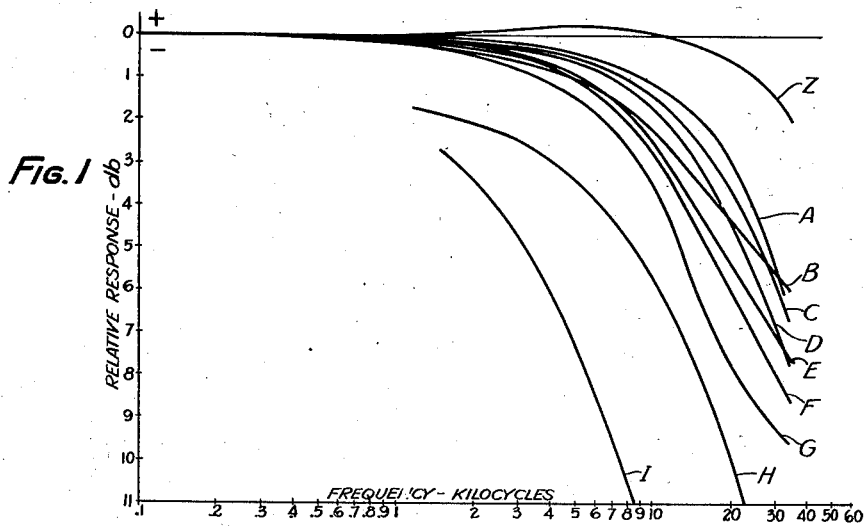
Fig. 1 is a group of curves showing for nine photoelectric cells in circuit the relative amplitude response, in decibels, at different frequencies up to about 35,000 cycles per second inclusive of the associated circuit effect, with a polarizing voltage of the order of 90 volts applied to the cells; and also for the associated circuit alone.

Fig. 1 is a group of curves showing the relative amplitude response, in decibels, at different frequencies, of nine different photoelectric cells of the gas type and their associated circuit showing the falling off in response over a frequency range from approximately 1,000 to 35,000 cycles per second. The ordinates of these curves are given in telephone transmission units, decibels, and represent the ratio of output current at the frequency under consideration to the output current at low frequencies, and the abscissæ are given in kilocycles per second on a logarithmic scale. These curves include the relative response due to the circuit to which the cell was coupled, which circuit effect is shown in curve Z. By subtracting the circuit effect shown by this curve from each of the other curves the photoelectric cell response characteristic is readily obtained. The curves A, B, C, D, F, G, H and I represent photoelectric cells containing argon gas at low pressure. The curve E represents a photoelectric cell containing neon gas at low pressure. All of these curves were taken with a polarizing voltage of 90 volts applied to the photoelectric cell with the exception of the cell represented by curve G to which was applied a polarizing voltage of 95 volts and for the cell represented by curve I to which was applied a polarizing voltage of 97 volts.

Figure 2:
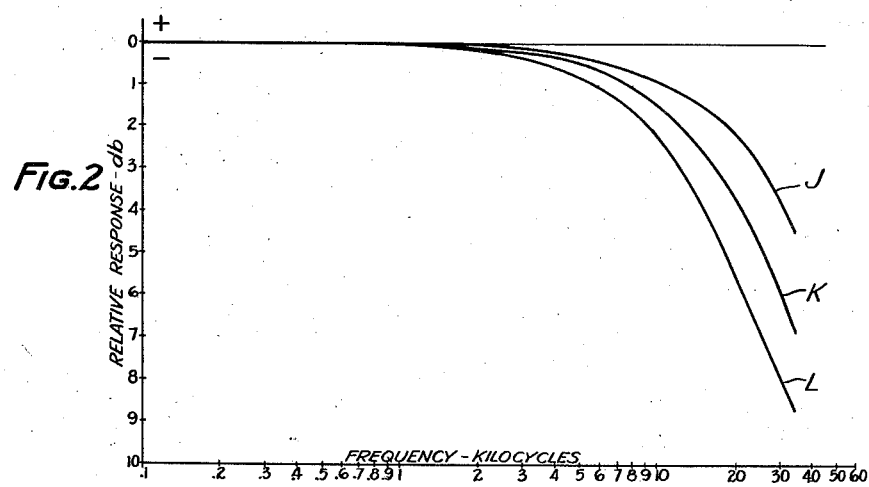
Fig. 2 is a group of curves for a given photoelectric cell showing the relative amplitude response, in decibels, at different frequencies up to about 35,000 cycles per second for the cell inclusive of the associated circuit effect, with polarizing voltages of 45, 90 and 135 volts, respectively.

The relative effect of different polarizing voltages is illustrated in Fig. 2 which shows similar curves for the photoelectric cell and its associated circuit represented by curve C in Fig. 1. Curve J shows the effect with a polarizing voltage of 45 volts, curve K with a polarizing voltage of 90 volts, and curve L with a polarizing votage of 135 volts. With these different polarizing voltages the decrease in response at 35,000 cycles per second is about two decibels greater with 90 volts than with 45 volts, and the decrease in response with 135 volts is also about two decibels greater than with 90 volts. The decrease in relative response up to about 1,000 cycles per second is comparatively small and practically unaffected by these different polarizing voltages. This indicates that as the polarizing voltage of the photoelectric cell is increased a larger amount of compensation is necessary to cause a uniform response at different frequencies.

Figure 3:
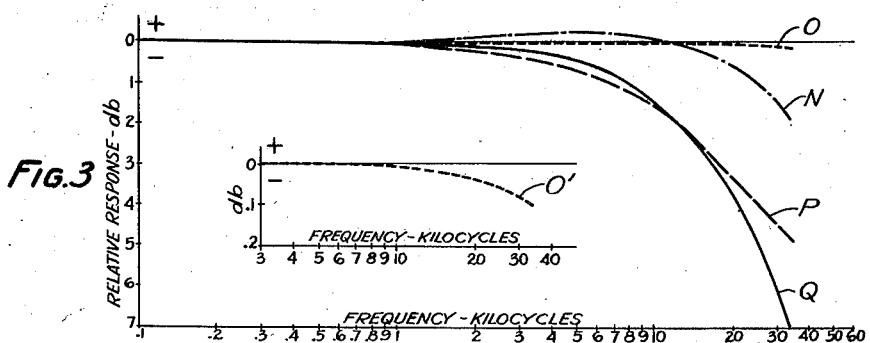
Fig. 3 is a group of curves showing the relative amplitude response, in decibels, at different frequencies up to about 35,000 cycles per second for a given cell due, respectively, to the inter-electrode capacitance effect of the cell, the gas effect of the cell, the associated circuit effect, and the total of all these effects with a polarizing voltage of 90 volts.

Fig. 3 shows a series of curves for the same photoelectric cell as is represented by curve C in Fig. 1, indicating, respectively, the relative response at different frequencies analyzed as to the associated circuit effect, curve N, the inter-electrode capacitance effect, curve O, the internal gas effect, curve P, and the total of all these effects, curve Q, with a polarizing voltage of 90 volts. The insert, curve O', in the lower left portion of this figure is a duplicate of the cell capacitance curve O, for frequencies above 1,000 cycles per second, drawn to an ordinate scale ten times as great as that of the other curves in order to show the shape of this curve more clearly than indicated by curve O of this group. The curves N, O and P each show the amount of the different effects and curve Q whose ordinates equal the sum of the ordinates of the other three curves shows the total effect. The circuit effects shown by curve N largely result from capacitances in the circuit and it will be noted that for one portion of the frequency range, namely, between approximately 1,000 to 10,000 cycles per second, the circuit has the effect of slightly increasing the response. However, circuits having different constants would be represented by curves of somewhat different shape. Therefore, this is not necessarily a typical curve, as is the case for the curves showing the inter-electrode capacitance effect and the gas effect of the cell.

In subsequent figures arrangements are shown for compensating for the effects of the circuit and the cells, which causes the signal current to have a uniform response at different frequencies.

There are two distinct methods of compensating for the non-uniform response of photoelectric cells at different frequencies, namely, by bringing down the response of the lower frequencies to the level of that of the highest frequency, or by raising the response of the higher frequencies to the level of that of the lowest frequency. The first mentioned method may be considered as a loss method and the other as a gain method.

Figure 4:
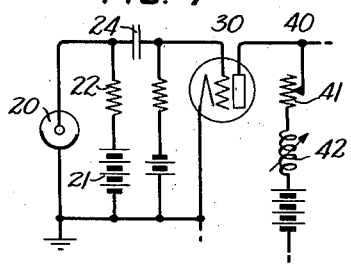
Fig. 4 is a circuit diagram of an equalizing network connected in the plate circuit of a vacuum tube in the associated amplifying system, and adjusted to substantially compensate for the falling off in response with increasing frequency.
Figure 8:
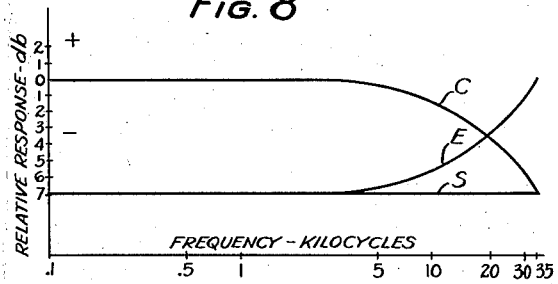
Figs. 8, 9, 10 and 11 are curves showing the relative amplitude response, in decibels, at different frequencies for a photoelectric cell and its associated circuit, the amplitude response of the several different types of equalizing networks, and the result obtained by each of the respective types of equalizing networks shown in the preceding four figures.

Figure 4 shows an equalizing network in which compensation is effected by the loss method. A photoelectric cell 20 is connected in series with a polarizing battery 21 and a resistance 22 through which the photoelectric current flows and causes a potential drop across the resistance which varies in accordance with the current passing therethrough. The alternating current components thus set up are impressed through a blocking condenser 24 upon the grid of a vacuum tube of the amplifier 30. The equalizing network 40 consists of a variable resistance 41 and a variable inductance 42 in shunt with the output circuit of the amplifier 30. The characteristic of this network is such that it offers an impedance to the flow of current through it, which increases with increasing frequency. As a result a greater proportion of the lower frequencies is suppressed than is the case with the higher frequencies. The values of the resistance and inductance may be so chosen that the characteristic of the network is practically complementary to that of the photoelectric cell and its associated circuit. The result of the action of such an equalizing network upon the photoelectric current of various frequencies is shown in Fig. 8. Curve C shows the variation in response of the photoelectric cell and its associated circuit over a frequency range of about 35,000 cycles; curve E, the characteristic of the equalizing network over this range; and curve S the resultant signal current. The resultant signal current has a substantially uniform amplitude throughout the entire frequency range of a value substantially the same as that of the photoelectric current at the highest frequency.

Figure 5:
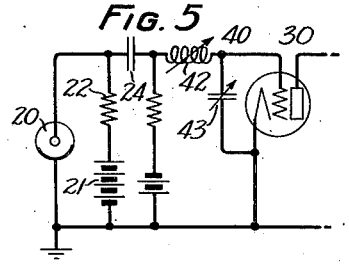
Fig. 5 is a circuit diagram of an equalizing network connected in the grid lead of a vacuum tube in the associated amplifying system.

Fig. 5 shows a gain method for compensating for the variation in response of the photoelectric cell and its associated circuit. A photoelectric cell 20 is connected in series with the polarizing battery 21 and a resistance 22. The equalizing network 40 in this arrangement is placed in the input circuit of the vacuum tube of the amplifier 30. The network consists primarily of an inductance 42 and a variable capacitance 43. This capacitance may consist largely of the input capacitance of the vacuum tube of the amplifier 30 as would be the case with the usual three element vacuum tube, or it may consist largely of an external capacitance as would be the case with a screen grid vacuum tube. The action of this network is such that the higher frequencies are transmitted with increasing ease and consequently the resultant signal current has a level throughout substantially equal to that of the lower frequencies. The inductance 42 and the capacitance 43 form a resonant circuit the characteristic of which is substantially the complement of the photoelectric cell response characteristic.

Figure 9:
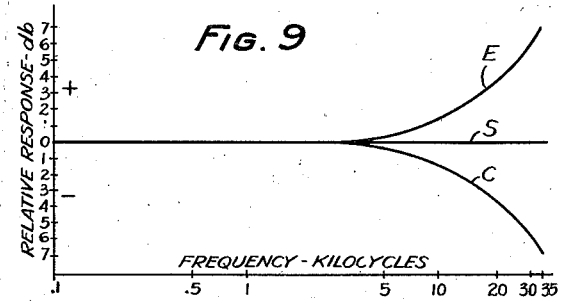

The result of the action of such an energizing network upon the photoelectric current of various frequencies is shown in Fig. 9. Curve C shows the variation in response of the photoelectric cell and its associated circuit over a frequency range of about 35,000 cycles; curve E, the characteristic of the equalizing network over this range; and curve S the resultant signal current. The resultant signal current has a substantially uniform amplitude throughout the entire frequency range of a value substantially the same as that of the photoelectric current at the lower frequencies. This type of equalizing network maintains the signal current throughout the entire frequency range at substantially the highest level of the photoelectric current at any frequency.

Figure 6:
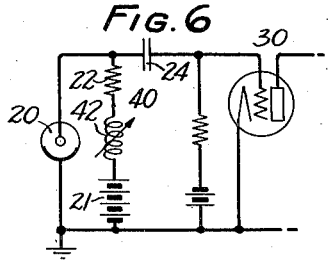
Fig. 6 is a circuit diagram of an equalizing network connected in the polarizing circuit of the photoelectric cell.
Figure 10:
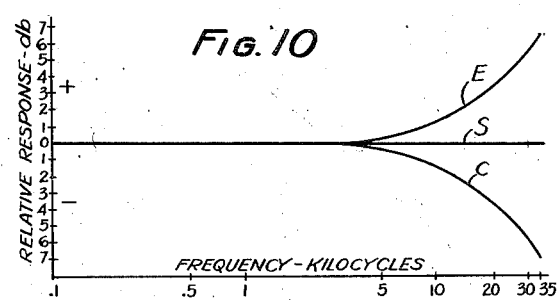

Fig. 6 shows still another arrangement for compensating for the variations in response of the photoelectric cell and its associated circuit. In this arrangement the compensating network is connected in series with the polarizing circuit of the photoelectric cell. A photoelectric cell 20 is connected in series with a polarizing battery 21, a resistance 22 and the equalizing network 40. The network consists of a variable inductance 42 and may have in multiple therewith a small variable capacitance, not shown in the drawings. The output circuit is effectively connected across the resistance 22 and the equalizing network 40 in series therewith. The action of this network is such that its impedance increases with increasing frequency and since the photoelectric current remains substantially constant irrespective of variations in the impedance of its output circuit, the potential drop across the series resistance 22 and the network 40 varies at such a rate as to substantially compensate for the decrease in response with frequency, of the photoelectric cell and its associated circuit. The result of the action of this equalizing network upon the photoelectric current of various frequencies is shown in Fig. 10. Curve C shows the variation in response of the photoelectric cell and its associated circuit over a frequency range of about 35,000 cycles; curve E, the characteristic of the equalizing network over this range; and curve S the resultant signal current. The resultant signal current has a substantially uniform amplitude throughout the entire frequency range of a value substantially the same as that of the photoelectric current at the lower frequency values. This type of equalizing network also maintains the signal current throughout the entire frequency range at substantially the highest level of the photoelectric current at any frequency.

Figure 7:
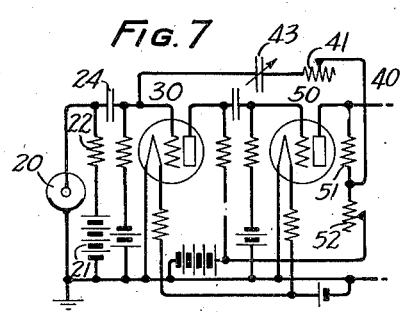
Fig. 7 is a circuit diagram of an equalizing network arranged to feed back energy from the output of one vacuum tube to the input of the preceding vacuum tube in the associated amplifying system.
Figure 11:
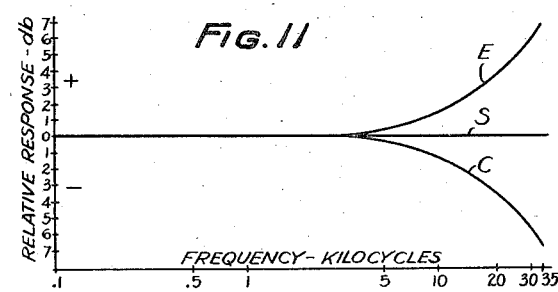

Fig. 7 shows still another arrangement for compensating for the variations in response of the photoelectric cell and its associated circuit. This is a regenerative arrangement whereby a part of the signal current is fed back from one of the amplifier output circuits into the input of a preceding amplifier. This arrangement is obviously a gain method and might even be designed to raise the amplitudes of the current at all frequencies. A photoelectric cell 20 is connected in series with a polarizing battery 21 and a resistance 22. The voltage variations produced in the resistance 22 by the photoelectric current are impressed upon the grid of the vacuum tube of the amplifier 30. The output of this amplifier is fed to the amplifier 50. The equalizing network 40 consists of a variable resistance 41 and a variable condenser 43 connected in series between the output of the amplifier 50 and the input of the amplifier 30, located as shown. Connection of this feed back circuit is preferably made between the resistance 51 and the variable resistance 52 in series with each other and in shunt with the output circuit of the amplifier 50. By adjusting the elements in this feed back circuit, the amount of the feed back voltages at different frequencies may be controlled and the action of the network made such that it increases for the higher frequencies at such a rate as to substantially compensate for the decrease in response with frequency of the photoelectric cell and its associated circuit. The result of the action of this compensating feed back network upon the photoelectric current of various frequencies is shown in Fig. 11. Curve C shows the variation in response of the photoelectric cell and its associated circuit over a frequency range of about 35,000 cycles; curve E the characteristic of the equalizing network over this range; and curve S the resultant signal current. The resultant signal current has a substantially uniform amplitude throughout the entire frequency range of a value at least substantially the same as that of the lower frequencies. However, as above stated, this equalizer may be designed to introduce a gain at all frequencies and to produce a resultant signal of substantially uniform amplitude at all frequencies and at a level higher than the maximum obtainable without the equalizing network. To thus raise the level at all frequencies the capacitance 43 must be shunted by a resistance which is not shown in the drawings. The function of such a resistance is to pass equal amounts of all frequencies thereby raising the overall level of the signal.

The arrangement selected for illustrating this invention comprises the combination of one or more photoelectric cells and equalizing networks in a television system as schematically shown in Fig. 12. The equalizing networks may be located at various positions in the transmitting or receiving circuits or in both. They are here indicated by the rectangles 200 and 210. Diagrammatic circuits of such networks are shown in Figs. 4, 5, 6, and 7 and described in connection with these figures. The photoelectric cell 20 may be excited by any suitable means such as a television scanning device 10 consisting of a source of light 11, a lens system 12 for condensing the light from said source in approximately parallel rays upon the scanning area of the scanning disc 13 containing apertures 14 spirally arranged therein, a field defining member 15 having an aperture 16 the size of the scanning field at the surface of the disc and a lens 17. This arrangement is a beam scanning system in which a beam of intense light is passed over the object 18 from which a portion is reflected or diffused into one or more photoelectric cells. A scanning arrangement and television circuits such as are shown in the copending application of Frank Gray, Serial No. 227,649, filed October 21, 1927, may be employed. The specification of the former application refers to an application of H. E. Ives and F. Gray which issued as Patent No. 2,037,471, April 14, 1936, in which there is shown a receiving circuit arrangement like that disclosed in this application. The photoelectric cell 20 is connected with any substantially distortionless amplifying system. A potential is impressed upon the photoelectric cell through a resistance 22 by the polarizing battery 21. As the photoelectric current is varied by the varying light excitation, the potential across the resistance 22 varies substantially in accordance therewith. The output of the light sensitive cell circuit is connected to the thermionic amplifiers 30, 40, 50, 60 and 70 and the equalizing networks 200 and 210. These amplifiers are made as nearly distortionless as practicable so that their amplification characteristics are substantially independent of frequency but whatever distortion they introduce may be compensated for. The networks 200 and 210 substantially compensate for amplitude distortion and, to some extent at least, for phase distortion. The separate networks 200 and 210 may be designed to compensate respectively for different ones of the various distortions mentioned above. Alternatively a single network may be used to correct for all distortion or more than two networks may be used if desired.

Curve Z of Fig. 1 was obtained with a circuit substantially like that of Fig. 12 for associating the cell with the amplifier.

The output of the amplifier 70 is impressed upon the transmission line 100 through any suitable coupling. Repeating coils designed to transmit alternating currents having components distributed over a wide range of frequencies such as disclosed in United States Patent to Horace Whittle, 1,752,406, March 25, 1930, may be used for coupling the terminal apparatus with each end of the transmission line. The incoming signals are impressed upon the substantially distortionless thermionic amplifiers 110, 120 and 130. The output circuit of the amplifier 130 is connected to the electro-optical receiving apparatus 140. The receiving apparatus may be similar to that disclosed in the copending application of Frank Gray, Serial No. 227,649, filed October 21, 1927, or application of H. E. Ives, Serial No. 442,503, filed April 8, 1930, British Patent 375,422, complete accepted June 27, 1932, contains the same disclosure as the Ives application referred to here.

The characteristics of the equalizing networks and the extent of their compensation are determined primarily by the characteristics of the photoelectric cell and the output circuit to which it is connected, the extent of the frequency band required for transmission, and the voltage employed in polarizing the photoelectric cell, all of which have been described and illustrated in Fig. 1, Fig. 2, and Fig. 3. The compensating networks may be of several types and may be located at different points in the television system as heretofore indicated.

In television transmission of images of even comparatively small size the photoelectric cell must respond to frequencies up to about 20,000 cycles per second and a band of frequencies from near zero to 40,000 cycles per second is used in certain systems. Even higher frequencies may later be employed. In sound film recording the photoelectric cell may be called upon to operate up to frequencies of ten or fifteen thousand cycles per second. But even for a much narrower frequency range compensation may be advantageous. Photoelectric cells as herein described have a much smaller response at the higher frequencies as compared to their response at the lower frequencies but with the equalizing arrangements here shown a substantially uniform response for varying frequencies is obtained without introducing effects which might be permissible in telephony but which cause objectionable distortion in picture transmission and television systems.

In television systems a large number of photoelectric cells may be used. This increases the inter-electrode capacity. Fig. 13 shows a typical arrangement where a number of large photoelectric cells are used at the transmitting terminal. In such arrangements where beam scanning is employed the cells are usually placed at the right and at the left of the object being scanned and even above the object and they are arranged so as to pick up reflected and diffused light over a wide solid angle. The transmitting arrangement shown in Fig. 13 may be connected to the amplifier circuits shown in Fig. 12 at the position indicated by the dot-dash line X—X. The photoelectric cells 20a, 20b and 20c are connected to the output circuit through the switches 23 and 24. Each cell may be connected or disconnected by means of this independent switching arrangement, there being a separate switch blade for each lead from each photoelectric cell. These switches are so designed as to introduce very little capacity into the circuits and are so arranged that when a photoelectric cell is disconnected there are no loose or dead ends in the operating circuit. By means of these switches it is possible to connect or disconnect the photoelectric cell on various sides of the object thus bringing out desired lights and shades.

While the curves shown in the drawings are for cells containing neon and argon, cells containing helium were also investigated and found to have even greater distorting action than neon or argon. The invention in its broad aspects is not limited to cells containing any particular gas or mixture of gases. The distorting action appears to be present in all gas filled cells, and so far as capacity effects are concerned, in all cells.

The terms "light" and "illumination" as used herein are intended to include not only electromagnetic waves of wave lengths within the visible spectrum, but also wave lengths above and below the visible spectrum.

What is claimed is:

A television image producing system comprising a photoelectric cell containing gas, means for exciting said cell at varying rates so as to produce electric current having components extending over a frequency range from zero to at least 40,000 cycles per second whereby serious distortion is produced by said gas in said cell in that portion of the frequency range above 4,000 cycles, means for substantially wholly compensating for the distortion due to said gas over the portion of the frequency range in which said gas produces distortion which means introduces distortion in the image current in the lowermost portion of the frequency range, said means being free from lumped inductance and comprising a series condenser in the transmission path, and separate means for subsequently compensating for the distortion produced by said first compensating means.

HERBERT E. IVES.
VICTOR SUBRIZI.